(12) United States Patent
Taware et al.

(10) Patent No.: US 7,346,469 B2
(45) Date of Patent: Mar. 18, 2008

(54) SYSTEM AND METHOD FOR SENSOR DATA VALIDATION

(75) Inventors: Avinash Vinayak Taware, Niskayuna, NY (US); Fei Teng, Shanghai (CN); Paul Teeporn Tanpitukpongse, Wilmington, DE (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/096,076

(22) Filed: Mar. 31, 2005

(65) Prior Publication Data

US 2006/0224357 A1 Oct. 5, 2006

(51) Int. Cl.
*G06F 19/00* (2006.01)
*G05D 17/00* (2006.01)

(52) U.S. Cl. ................................ 702/179; 700/287
(58) Field of Classification Search ............. 702/179, 702/182, 59, 183–185; 703/2; 700/287, 700/286; 714/25
See application file for complete search history.

(56) References Cited

U.S. PATENT DOCUMENTS

| 5,626,140 | A | * | 5/1997 | Feldman et al. | 600/484 |
| 5,729,451 | A | * | 3/1998 | Gibbs et al. | 702/12 |
| 5,850,625 | A | * | 12/1998 | Maren et al. | 702/93 |
| 5,903,459 | A | * | 5/1999 | Greenwood et al. | 700/110 |
| 6,092,033 | A | * | 7/2000 | Uhlmann | 702/189 |
| 6,502,042 | B1 | * | 12/2002 | Eid et al. | 702/50 |
| 6,757,668 | B1 | * | 6/2004 | Goebel et al. | 706/59 |
| 6,829,568 | B2 | * | 12/2004 | Julier et al. | 702/189 |
| 6,944,566 | B2 | * | 9/2005 | Chen et al. | 702/116 |
| 2004/0120550 | A1 | | 6/2004 | Comaniciu | 382/107 |
| 2004/0243344 | A1 | | 12/2004 | Kronhamn et al. | 702/182 |

OTHER PUBLICATIONS

Jin et al., MutliSensor State Fusion Estimation With Correlated Measurement Noise, Nov. 2-5, 2003, Proceedings of the Second International Conference on Machine Learning and Cybernetics, pp. 1000-1003.*
Sun, S., MultiSensor Optimal Information Fusion Input White Noise Deconvolution Estimators, Aug. 2004, IEEE Transactions on Systems, Man, and Cybernetics, Part B: Cybernetics, vol. 34, No. 4, pp. 1886-1893.*
Roemer et al., Improved Diagnostic and Prognostic Assessments Using Health Management Information Fusion, 2001 IEEE, pp. 365-377.*
Hong et al., Knowledged-based Diagnostic System of Turbine With Faults Using the Blackboard Model, Oct. 28-31, 1997, International Conference on Intelligent processing Systems, pp. 1516-1519.*

* cited by examiner

*Primary Examiner*—John Barlow
*Assistant Examiner*—Toan M. Le
(74) *Attorney, Agent, or Firm*—Fletcher Yoder (57) ABSTRACT

In accordance with an implementation of the present technique, a method for processing data is disclosed. The method involves analyzing consistency of sensor readings obtained from a plurality of sensors monitoring a device, where each sensor reading is indicative of at least one operational parameter of the device. The method also involves assigning a confidence value to each of the sensor readings, where the confidence value is indicative of an operational condition of one of the plurality of sensors that provided the sensor reading. The method also includes weighting each sensor reading based on the confidence value assigned to the sensor reading to determine an acceptance or a rejection of the sensor reading and fusing the sensor readings that are accepted to obtain a fused sensor reading corresponding to the operational parameter measured by the sensors on the device.

24 Claims, 5 Drawing Sheets

FIG. 5

SYSTEM AND METHOD FOR SENSOR DATA VALIDATION

BACKGROUND

The invention relates generally to a system and method for processing sensor data, and in particular to a system and method for the validation and fusion of signals from a plurality of sensors.

Sensors are used to measure a variety of data in a wide range of systems. Many sensors are designed so that their output changes based on changing conditions in an environment of interest. A typical use of a sensor system is to monitor the performance of a host device so that the performance of the host device may be efficiently controlled. The sensors are typically used to measure and gather information about important operating parameters of the host device, such as temperature inside the device, surrounding temperature, pressure within and outside the device, inlet and exhaust temperatures in the device, among other parameters.

Data from sensors is typically provided to a processing unit for evaluation. Based on the evaluation, the control system may alter or control the functioning of the host device in order to improve its efficiency. Better control of the host device is possible when the sensor data is more accurate. Determining whether sensors are providing accurate data is particularly difficult when the host device operates in a stressful environment that may damage sensors. An example of such a host device is an aircraft engine. If a sensor that measures an operational parameter of the engine is broken and not supplying accurate data, control of the engine based on the sensor output may be less efficient. Accordingly, performance of the host device may suffer.

To help improve the accuracy of sensor data, some systems employ multiple sensors to measure the same parameter. The output of the multiple sensors may be evaluated to determine whether readings from any of the multiple sensors indicate that the sensor is no longer functioning properly. An improved method and system for identifying failed sensors and determining an accurate data value based on readings from the multiple sensors is desirable.

BRIEF DESCRIPTION

In accordance with an implementation of the present technique, a method for processing data is disclosed. The method involves analyzing consistency of sensor readings obtained from a plurality of sensors monitoring a device, where each sensor reading is indicative of at least one operational parameter of the device. The method also involves assigning a confidence value to each of the sensor readings, where the confidence value is indicative of an operational condition of one of the plurality of sensors that provided the sensor reading. The method also includes weighting each sensor reading based on the confidence value assigned to the sensor reading to determine an acceptance or a rejection of the sensor reading and fusing the sensor readings that are accepted to obtain a fused sensor reading corresponding to the operational parameter measured by the sensors on the device.

In accordance with another implementation of the present technique, a sensor system is disclosed. The sensor system includes a plurality of sensors adapted to provide sensor readings. Each sensor reading is indicative of an operational parameter of a device. The sensor system also includes a calculation module adapted to calculate a covariance of the sensor reading or a correlation of divergence of at least two of the sensor readings and an analysis module configured to assign a confidence value to the sensor reading or to determine a dynamic consistency of the sensor reading. Furthermore, the sensor system includes a fusion module configured to determine a reliable sensor reading based on at least a weighting of the sensor reading based on the confidence value assigned to the sensor reading or the dynamic consistency of the sensor reading.

In accordance with yet another implementation of the present technique, a computer readable medium is disclosed. The computer readable medium includes code adapted to analyze consistency of a plurality of sensor readings, where each sensor reading is indicative of an operational parameter of a device. The computer readable medium further includes code adapted to assign a confidence value to each of the sensor readings, where the confidence value is indicative of signal stability of a sensor that provided the sensor reading. Furthermore, the computer readable medium includes code adapted to weight each sensor reading based on the confidence value assigned to the sensor reading to determine an acceptance or a rejection of the sensor reading and code adapted to fuse the sensor readings that are accepted to obtain a final sensor reading, wherein the final sensor reading provides a reliable indication of the operational parameter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
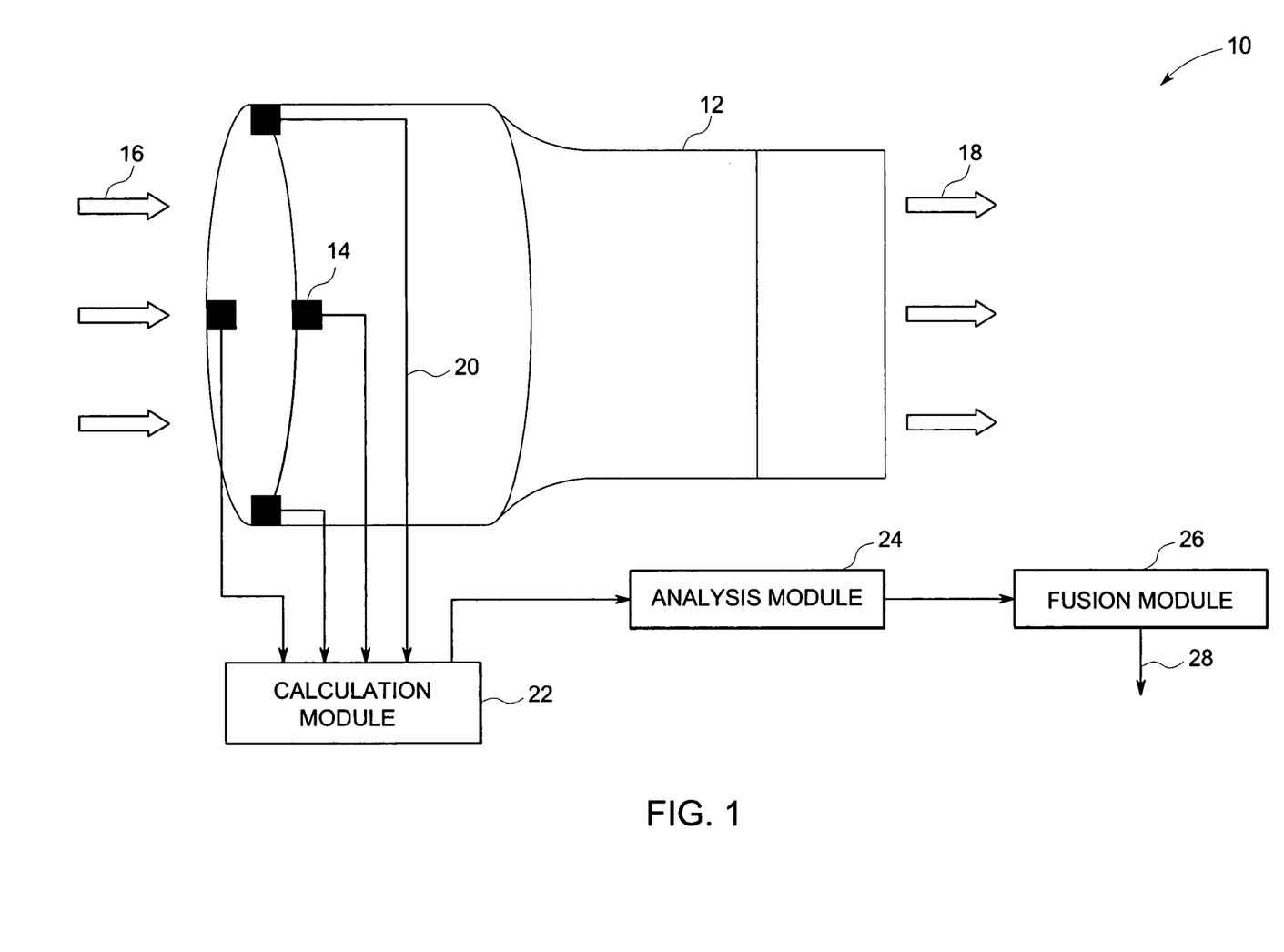
FIG. 1 is a diagram showing an exemplary sensor system in accordance with certain aspects of the present technique.

Turning now to the drawings and referring first to FIG. 1, an exemplary sensor system 10 for monitoring an aircraft engine 12 is illustrated in accordance with certain aspects of the present technique. The aircraft engine technology based gas turbine system or aircraft engine itself is considered for one embodiment of the present technique. It should be noted that the present technique applies to any system that has plurality of sensors used to measure parameters.

The sensor system 10 includes a plurality of sensors 14 disposed at specific locations in the aircraft engine 12 for monitoring various operational parameters. Examples of operational parameters that may be measured include temperature at the inlet of the compressor of the aircraft engine, mass flow rate of air flowing into the engine (indicated by reference numeral 16), mass flow rate of air flowing out of the engine (indicated by reference numeral 18), pressures developed within and around the engine, noise levels or vibrations within and around the engine, speed of rotation of turbine blades in the engine, rate of fuel consumption and the like. In the exemplary embodiment illustrated in FIG. 1, the plurality of sensors 14 is adapted to measure inlet temperature conditions of the engine. It must be noted that the plurality of sensors measure a single operational parameter (in this case the inlet temperature) to ensure redundancy. For the discussion of the various embodiments herein below, dual sensor and quadruple sensor arrangement are chosen. However, as will be appreciated by a person skilled in the art, the present technique can be applied to any other sensor having a different redundancy of sensors for the measurement of the operational parameter. As will be appreciated by those of ordinary skill in the art, the present technique may be applied to measure other operational parameters of other suitable devices. Common examples of the devices that may profit from monitoring in accordance with the present technique include wind turbines, gas turbines, steam turbines, water turbines, fuel cells and the like. Also, in the case of the aircraft engine 12, another commonly measured operational parameter is the acoustic condition inside the combustor of the aircraft engine 12.

The use of the plurality of sensors 14 in accordance with the present technique facilitates a determination of whether information from a particular sensor is reliable. Also, data, in the form of plurality of sensor readings and generally referred to by reference numeral 20, obtained from the plurality of sensors 14 may be employed in accordance with the present technique to identify potential problems with one or more of the sensors. A sensor reading is the data value from the sensor. In certain instances, the sensor reading is instantaneous while in certain implementations, the sensor reading may also be a historical data value. The embodiment illustrated in FIG. 1 employs four sensors, but those of ordinary skill in the art will appreciate that systems constructed in accordance with the present technique may employ other numbers of sensors, depending on design criteria for the particular system.

In the embodiment depicted in FIG. 1, the sensor system 10 further includes a calculation module 22, an analysis module 24 and a fusion module 26. The fusion module 26 provides a fused sensor reading 28 representative of the operational parameter that the sensors 14 are intended to measure. The sensor system 10, via the aforementioned modules 22, 24 and 26, is configured to detect and isolate a faulty sensor reading before incorrect information is incorporated into the fused signal 28.

The calculation module 22 is typically used to determine a covariance of each sensor reading as well as a correlation between the sensor readings. Covariance of a sensor reading is used as an indication of noise in the sensor reading. Covariance is calculated for each sensor reading because the sensor reading is a variable. At any instant, each sensor reading provides a data value that is the instantaneous value of the operational parameter measured by each of the plurality of sensors 14. The determination of covariance is based on comparison of an instantaneous value of the sensor reading indicated by the sensor with a set of historical data values of sensor readings from the same sensor.

Covariance provides an indication of how two variables vary together. For example, if M(x) and M(y) are the mean values of two separate variables 'x' and 'y', then covariance of x and y may be defined as:

$$\text{Covariance}(x,y) = M\{[x - M(x)][y - M(y)]\}$$

In other words, covariance calculation of the variables x and y involves determining the differences of the variables from their means and multiplying them together. If the product is positive, it may be construed that both x and y have varied together in the same direction. If, however, the product is negative, then the variation of x and y are in the opposite direction i.e., x has increased while y has decreased and vice versa. In certain instances, when the random variables are independent of each other, the covariance may be termed as being zero-covariance.

Covariance may further be classified as auto-covariance and cross-covariance. In auto-covariance calculation, covariance is calculated for each sensor reading separately. Thus, if there are 4 sensor readings A, B, C and D (as in the case of a quadruple sensor arrangement), auto-covariance may yield four covariance values, one for each sensor reading. In the case of cross-covariance calculation in a quadruple sensor arrangement, the cross-covariance yields six covariance values i.e., covariance of sensor readings AB, AC, AD, BC, BD and CD.

Apart from determining covariance of the sensor readings, the calculation module 22 is also configured to determine a divergence of correlation between the sensor readings. For example, the correlation between two sensor readings is the degree to which there is a 'linear relationship' between them. Correlation is usually expressed as a 'coefficient' that measures the strength of that linear relationship between the variables. Typically, divergence of correlation is used to detect any drift in the plurality of sensor readings. Correlation, typically, in more specific terms refers to auto-correlation. However, other ways of determining correlation as known in the art may also be appropriately applied.

Symbolically, the determination of covariance and correlation of sensor readings A and B in a dual sensor arrangement may be represented as:

$$Cov_i = \frac{1}{N-1} \sum_{k=1}^{N} \left( S_i(k) - \frac{1}{N} \sum_{m=1}^{N} S_i(m) \right)^2$$

where $S_i$ indicates $i^{th}$ sensor in the redundant sensor arrangement, 'N' is a fixed window size of data at a time and 'm' is the lag of correlation sequence. For instance, "i" can be 1 or 2. As the above equation is defined the same sensor, it represents auto-covariance of the $i^{th}$ sensor. In certain implementations, m can be equal to zero. For the present technique, the two redundant sensors are denoted as Sensor A and Sensor B. With this notation, correlation may be defined as:

$$Corr(m) = \frac{1}{N} \sum_{k=1}^{N-m} \left( (A(k) - B(k)) \times (A(k+m) - B(k+m)) \right)$$

The analysis module 24 is configured to receive as input the determined covariances of each of the sensor readings as well as the divergence of correlation between the sensor readings. The analysis module 24 then processes the covariances and the divergence of correlation to determine whether each sensor reading provides a good indication of the operational parameter. In one implementation, based on the inputs to the analysis module 24, the analysis module may determine a confidence value for each sensor reading.

The confidence value provides an indication of noiselessness levels i.e., the degree of absence of noise in the sensor reading. In another implementation, the analysis module 24 may be configured to determine a drift in the sensor reading between the measured value and a predicted value. In certain other implementations, the analysis module 24 may detect spiking in sensor reading. When the auto-correlation value, that is indicative of the variance of redundant sensor reading, exceeds a certain threshold, it is likely that one of the sensors is spiking (positive or negative). In that case, the spiking sensor will have higher covariance indicating the instability of corresponding sensor data. In other words, whenever a sensor spikes (instantaneous increase or decrease), the auto-correlation of the divergence between the redundant sensor data and the auto-covariance of individual sensor can be used to detect such spiking. In yet another implementation, the analysis module 24 may be configured to determine a dynamic consistency of the sensor readings. It may be noted that with the determination of noise, spiking condition, drift, and dynamic consistencies of the sensor readings, a faulty sensor reading and thereby the faulty sensor that generated the faulty sensor reading may be identified and isolated. In other words, each sensor reading may be tagged as being accepted or rejected based on the above determinations. Moreover, each of the determinations specified herein may be performed simultaneously or separately and may be construed as being within the scope of the present technique. In other exemplary embodiments of the present technique, it is also possible that certain determinations are not carried out. Each of the determinations will be explained in greater detail in the sections herein below.

The fusion module 26 takes as input, all the sensor readings that are tagged as being accepted. The fusion module 26 fuses the accepted sensor readings and forms the fused sensor reading 28 that provides an indication of the combined sensor readings of the measured operational parameter. Such an indication of the operational parameter is useful in determining the operating conditions of the aircraft engine (or any other monitored device in other implementations). For instance, in the case of an aircraft engine technology based gas turbine, the fused sensor data that captures combustor acoustics along with faulty sensor detection may be used to correctly control the fuel or air flow to the combustor in order to reduce acoustics. Any control that gets driven by faulty sensor will worsen the operation of the engine. For example, if the selection logic is selecting the maximum of the two redundant acoustic sensors typically used in an aircraft engine combustor, the control logic may produce undesirable results if one of the sensors fails high within its range. In that case, the control logic would unnecessarily reduce fuel flow to the combustor to reduce acoustics as it is being driven by the false high acoustics indicated by the faulty sensor. In such situations, the engine combustor may blow out (flame extinguishes) or may step down in power unnecessarily due to sensor fault. Similarly, noisy, drifting or spiking sensors would adversely affect the performance of the control. The present sensor validation, fault detection and fusion logic would avoid such situations by detecting the false high and using the fused value instead to drive the fuel or airflow control.

Figure 2:
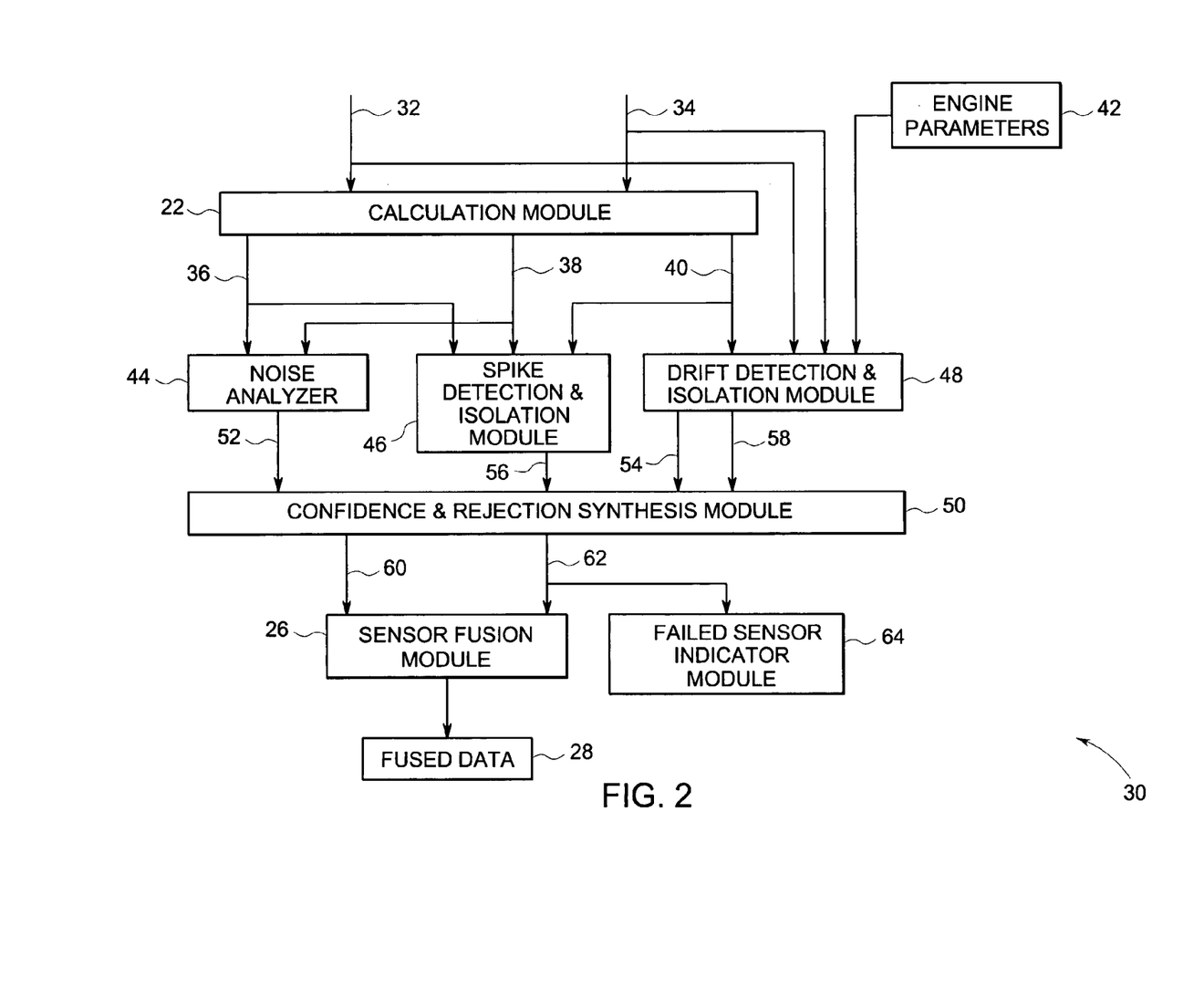
FIG. 2 is a block diagram showing a sensor system that includes two redundant sensors in accordance with certain aspects of the present technique.

FIG. 2 is a block diagram showing a sensor system that includes two redundant sensors in accordance with certain aspects of the present technique. The embodiment shown in FIG. 2 is generally referred to by the reference numeral 30. In the presently illustrated embodiment, a dual sensor arrangement is chosen. As explained in earlier sections, the implementation involves the use of the calculation module 22, the analysis module 24, and the fusion module 26 (FIG. 1).

In the embodiment shown in FIG. 2, the calculation module 22 is configured to receive as input a sensor reading 32 and a sensor reading 34 from the dual sensor arrangement and to determine a covariance and a correlation of divergence between each of the sensor readings. The output from the calculation module 22 includes a signal 36 indicating covariance of the sensor reading 32, a signal 38 indicating the covariance of the sensor reading 34 and a signal 40 indicating correlation between the sensor readings 32 and 34.

The analysis module 24 is configured to receive as input at least the determined signals 36, 38 and 40. Apart from this, the analysis module 24 is also adapted to receive the actual sensor readings 32, 34 and engine parameters 42. The exemplary embodiment shown in FIG. 2 includes a noise analyzer 44, a spike detection and isolation (SDI) module 46, a drift detection and isolation (DDI) module 48 and a confidence and rejection synthesis (CRS) module 50. The noise analyzer 44 is configured to process the signals 36 and 38 and to determine a confidence value (generally represented by reference numeral 52) for each sensor reading 32 and 34. The confidence value 52 is determined in terms of signal stability. In other words, the confidence value 52 may be considered as an indication of noiselessness in the sensor reading. As will be appreciated by a person skilled in the art, the variances of each sensor reading can be used as a measure of the stability of the sensor reading. Therefore, the greater the stability of the sensor reading, the greater is the confidence value assigned to the sensor reading. It should be noted that in certain implementations, the confidence value of a sensor reading is assigned in terms of the relative variance normalized using the sum of the covariances of the sensor readings from the two sensors. Symbolically, the noiselessness confidence values, of the sensor readings 32 and 34 may be represented as:

$$\text{Noiselessness\_confidence\_32} = 1 - \left(\frac{COV_A}{COV_A + COV_B}\right)$$
$$= \left(\frac{COV_B}{COV_A + COV_B}\right)$$

$$\text{Similarly, Noiselessness\_confidence\_34} = 1 - \left(\frac{COV_B}{COV_A + COV_B}\right)$$
$$= \left(\frac{COV_A}{COV_A + COV_B}\right)$$

As will be appreciated by a person skilled in the art, sensors have associated specific normal noise threshold values. The normal noise threshold (NNT) is indicative of a physically possible variance in sensor reading from that particular sensor. If, during operation, a particular sensor provides a sensor reading whose variance is under the NNT, then the confidence value assigned to that particular sensor reading, and thereby to the sensor, will be zero, as it indicates a lifeless or a dead sensor. Any sensor reading that does not have a variance under the NNT value is assigned a confidence value from 0% to 100% depending upon the covariance of the sensor data. However, since the sensor reading represents the instantaneous value of the operational parameter measured by the sensor, there may be instances in which all of the plurality of sensors 14 has a variance that is under the NNT. In such a case, the noiselessness confidence will hold the value that was previously assigned as it is not advisable to assign zero confidence to both sensors and reject them. It must be noted that this assignment of confidence values to the sensor readings happens on a continuous basis since the sensors are configured to continuously monitor one or more operational parameters in the device being monitored.

The SDI module 46 is configured to receive as input the covariances 36, 38 of the two sensor readings 32 and 34 along with the signal 40 of the two sensor readings 32 and 34. As specified hereinabove, the signal 40 of the two sensor readings is indicative of correlation of divergence of the two sensor readings from each other. Spiking in a sensor may be defined unexpected instantaneous change in the sensor value when compared to the recent history of the sensor data with all operating conditions of the system remaining unchanged. This may be interpreted as an instantaneous change in the rate of change of the signal causing the signal to spike up or down when compared to the recent history of the sensor value. Any spiking that is outside range of the sensor can be easily detected. However, spiking within range has to be isolated since it could be due to a faulty sensor or due to real condition in the engine in this exemplary embodiment. Henceforth, spiking would refer to the one due to a faulty sensor. The SDI module 46 uses the signal 40 to identify the spiking event and uses the signals 36 and 38 (indicative of covariances of the sensor readings 32 and 34) to isolate the faulty sensor. Unlike the noise analyzer 44, the SDI module 46 operates with an assumption that the variance of the sensor readings 32 and 34 is always above the NNT. The SDI module 46 may be thought of as performing two different functions: detection and isolation of one or more spiking sensors. The isolation function comes into effect only if the SDI module 46 detects spiking. Once a spiking sensor is detected and isolated, the rejection flags 56 based on spiking for the two sensors are set indicating the spiking sensor to be rejected. An event wherein both sensors are spiking is treated as a special event and both rejection flags are reset and an alarm is triggered to indicate a possible "both sensors faulty" situation. In the presently illustrated embodiment, correlation of the two sensor readings is obtained by auto-correlation. However, various means of determining the correlation known in the art may also be appropriately applied.

For spiking to exist in a sensor reading, the correlation of the sensor readings must exceed a threshold value termed the "spike detection threshold". For example, if the correlation exceeds the spike detection threshold, the SDI module 46 concludes that there is a spiking sensor. Once the conclusion is made, the isolation function comes into effect. In the isolation phase, the SDI module 46 makes a comparison between the variances of the two sensors. If the variances are the same, then the isolation phase does not function. However, if the variances are different, then the SDI module 46 picks out the sensor that provided the sensor reading with the biggest variance for comparison with a spike isolation threshold. As specified earlier, if this variance exceeds the spike isolation threshold, the sensor that provided the sensor reading is deemed to be a faulty sensor due to spiking.

In certain instances, when the spike detection threshold is not exceeded, the SDI module 46 determines a conclusion that both the sensors are not spiking. Also, in certain other instances, when the spike detection threshold is exceeded, and only one faulty sensor is identified from among the two sensors, the non-faulty sensor is readily determinable.

The DDI module 48 uses the correlation to detect drifts in the sensor readings. Drift of a sensor reading may be defined as the deviation of the sensor reading from its predicted or expected value. The DDI module 48 assigns a different confidence value to each of the sensor readings based on the identified drift. Isolation of the sensor that exhibits a drift is based on determination of the driftlessness level confidence value. The function of the DDI module 48 will be explained in greater detail in the sections that follow. It should be noted that the DDI module 48 may employ a prediction model. Examples of prediction models include, but not limited to, regression models and physics based models. In one embodiment, a regression model can be used that is updated using a Recursive Least Squares (RLS) to predict normal or expected values for each sensor for comparison with the instantaneous value of the sensor reading. The DDI module 48 also accepts as input one or more engine parameters 42 for the regression model that correlates the engine parameter being measured by sensor 32 and sensor 34. This regression model is then used to predict the value of the parameter to be compared with the sensed value. This model in this exemplary embodiment is adapted using RLS method so that the model matches the healthy sensor data. In other words, the regression model is adapted to be engine or system specific so that it can be used to predict expected parameter values. Once adapted, the regression model can used to predict sensor values and detect drifts in the sensor data. In general, depending upon the parameter being measured, a model to estimate the parameter can be built. This could be a regression model as in this exemplary embodiment, that estimates the parameter by correlating it to certain other parameters of the system or it could be physics based relationship that uses certain other parameters of system to estimate the parameter of interest. At the same time, the model could be simply a time series prediction model that uses past values of the parameter of interest to estimate the value at the current time instant. Again the model could be static or dynamic. In this exemplary embodiment, the divergence of the two sensors can be defined as $$Divg_A = |A - A_{predicted}|,$$

$$Divg_B = |B - B_{predicted}|$$

where A and B represent the values of sensor 32 and 34 respectively and $A_{predicted}$, $B_{predicted}$ are the values predicted by the regression model being updated by the RLS to match engine running conditions. Based upon the divergence, the confidence of "driftlessness" (degree of absence of drift) 54 for each sensor can be defined as $$\text{Driftlessness\_confidence\_32} = 1 - \frac{Divg_A}{Divg_A + Divg_B}$$

$$= \frac{Divg_B}{Divg_A + Divg_B}$$

$$\text{Driftlessness\_confidence\_34} = 1 - \frac{Divg_B}{Divg_A + Divg_B}$$

$$= \frac{Divg_A}{Divg_A + Divg_B}$$

A drift condition is detected by using the correlation of the divergence of the two sensor readings. A drift flag to indicate the same is set when the correlation is above a certain drift detection threshold. Since the regression model being used to predict the parameter value is being updated using RLS algorithm, it is necessary to establish that the adaptation is completed in order to use the model to predict the parameter and establish divergence of each sensor from the predicted value as shown above. Thus, in order to assign a driftlessness confidence 54, the drift flag should set and the RLS algorithm should have converged. The convergence of the RLS algorithm can be concluded using the magnitude of the scaled error between the model and actual engine parameter indicated by the healthy sensor. If the error is greater than some threshold, the model has not converged. A condition wherein the drift flag has been set as well as the RLS model has converged is captured by setting the drift detection enable flag. Using the driftlessness confidence of each sensor, a rejection flag 58 is set or reset for each sensor. If the "driftlessness" confidence 54 for a sensor is below a certain threshold, the drift based rejection flag 58 is set for that sensor indicating that the sensor be rejected as it is drifting. Also, only when the drift detection flag, which is sent as output of DDI module 48 along with the drift based rejection flags 58, is set, the drift detection of the sensor signals can be assessed in the confidence and rejection synthesis module 50 using the drift based rejection flags 58.

As will be apparent from the discussions above, each of the two sensor readings 32 and 34 have two associated confidence values—a noiselessness based confidence value 52 and a driftlessness based confidence value 54. Further, each sensor reading also has two reject flags, generally represented by reference numerals 56 for the spiking based rejection flag and 58 for the drift based rejection flag for each sensor, which are the outputs from the SDI module 46 and the DDI module 48 respectively. The CRS module 50 accepts these inputs and makes a final determination of which sensor reading to accept or which sensor reading to reject. In the presently illustrated embodiment, the CRS module 50 checks the spiking based reject flag 56 for each sensor to see if spiking occurred. If spiking is indeed detected, then the sensor is deemed to be faulty. If spiking is not detected, then the CRS module 50 checks the drift based reject value 58 for each sensor reading to determine whether drift occurred. However, the drift detection enable flag should be set to ensure that the drift flag is set (existence of drift condition) and the RLS algorithm has converged. If then, the drift based reject flag for only one sensor is activated, the sensor is deemed to be faulty. The other sensor is then considered to be non-faulty. However, if the drift based reject flags for each of the sensor reading are activated, meaning that drift occurred in both sensors, the minimum of the two confidence of each sensor is taken as the confidence of the sensor. A similar assignment of confidence of the sensor may also happen when the reject value for each of the sensor reading is deactivated. In the event the drift detection enable flag is not active implying there is no drift event and/or the RLS model has not converged, the minimum of noiselessness confidence and "driftlessness" confidence of each sensor is exported as the final confidence of the sensor and no sensor is rejected.

The sensor fusion module 26 takes a confidence values 60 of the two sensors and a sensor rejection flag 62 of sensor readings deemed to be accepted for consideration and form a fused sensor reading 28. The fused sensor reading 28, in certain implementations may be the fusion of raw readings weighted by their respective confidence values. The fused sensor reading 28 is always less than or equal to the maximum of the individual sensor readings. A failed sensor indicator module 64 uses the reject flag 62 provided by the CRS module 50 to indicate a failed or faulty sensor or sensor or raise an alarm when both sensors indicate spiking or drifting condition.

As will be appreciated by a person skilled in the art, the aspects of the present technique, discussed with respect to the embodiment illustrated in FIG. 2 can be used to detect a faulty sensor and thereby faulty sensor readings. When applied in the context of the aircraft engine technology based turbine system, the technique can help eliminate false indications of high acoustic signals in the engine when the problem may actually be in one or more of the sensors instead of with the engine itself. As mentioned earlier, while high acoustic signals may be an indication of abnormal pressure within the engine, a wrong indication causes an undue or an expensive maintenance shutdown of the system using the aircraft engine. Examples of faulty indications include: difference in readings between multiple sensors used for measuring the single operational parameter, a very high or a very low amplitude of the sensor reading or an abnormal rate at which the amplitude of the sensor reading changes with respect to each sensor. Further advantages of using the present technique where applicable include reduced operational costs, increased emission compliance, and increased accuracy of indication of an onset of a maintenance requirement.

Figure 3:
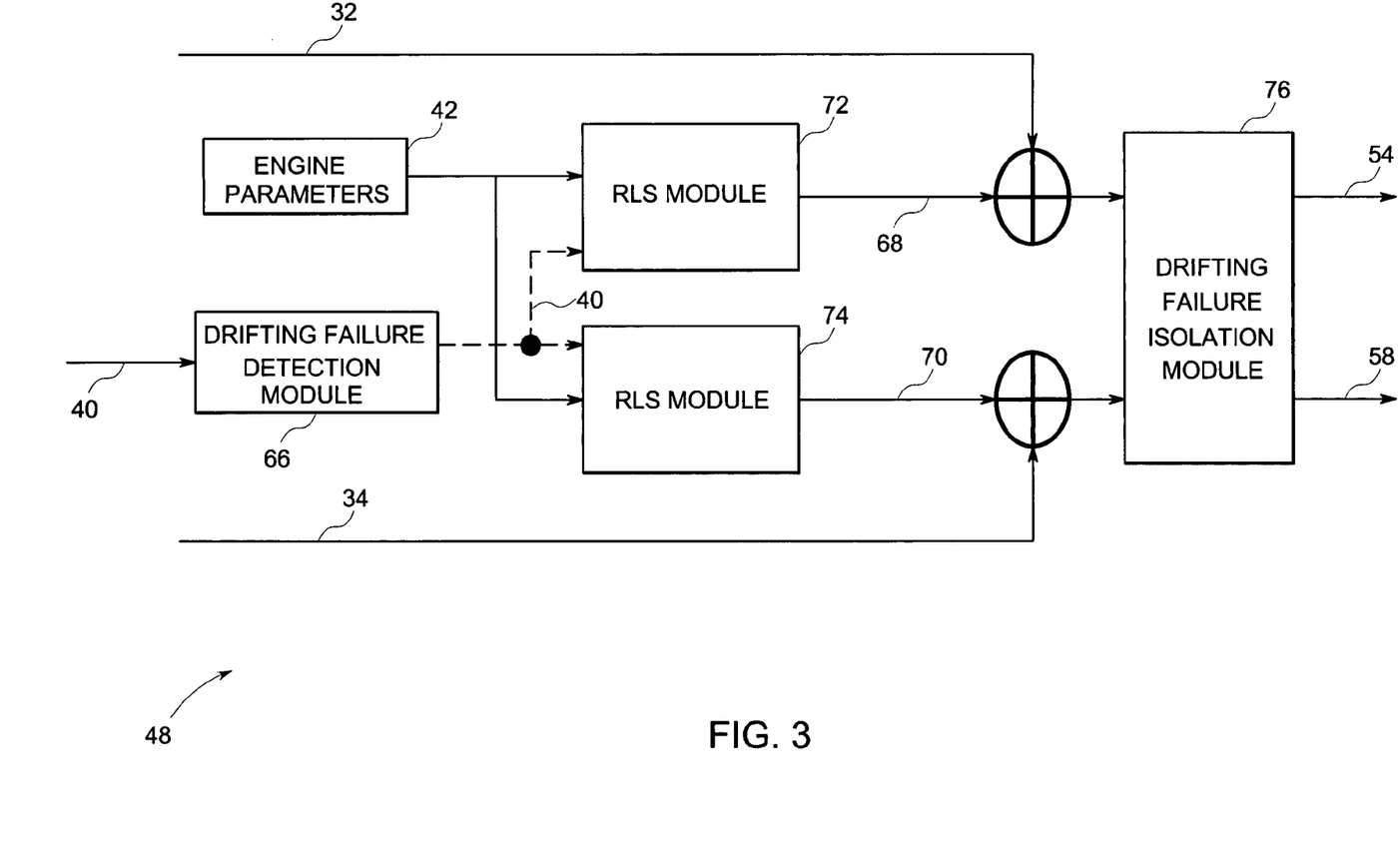
FIG. 3 is a block diagram showing an exemplary drift detection and isolation module in accordance with certain aspects of the present technique.

FIG. 3 is a block diagram showing an exemplary drift detection and isolation (DDI) module 48 in accordance with certain aspects of the present technique. The DDI module 48 accepts as input the two sensor readings 32 and 34, the correlation 40 of the two sensor readings 32 and 34, and the engine parameters 42. As explained previously, the correlation 40 of the two sensor readings 32, 34 is used to detect drift in one or both the sensors via a drifting failure detection module 66, which is a part of the DDI module 48. Once the drift is detected, the drift flag is set as specified hereinabove. The RLS model is used to generate predicted values 68, 70 for each of the two sensor readings 32 and 34 via RLS modules 72 and 74 that use regression models adapted using RLS. In order to generate the predicted values 68, 70 from the sensors, the RLS model receives the engine parameters 42 as input, along with the correlation 40 between the two sensor readings 32 and 34. The engine parameters 42 indicate various values for the different operational parameters that can be measured by the sensors. The instantaneous values of the sensor readings 32 and 34 are then compared with the predicted values from the sensors. The drifting failure isolation module 76 receives as input the comparison between the instantaneous values and the predicted values to determine whether any sensor reading has to be rejected from consideration or be accepted. The reject flags for each of the sensor readings from the DDI module 48 are generally represented by reference numeral 58. At the same time, the drift enable detection flag and the driftlessness confidence value 54 for each sensor is given as output of the module 76.

Figure 4:
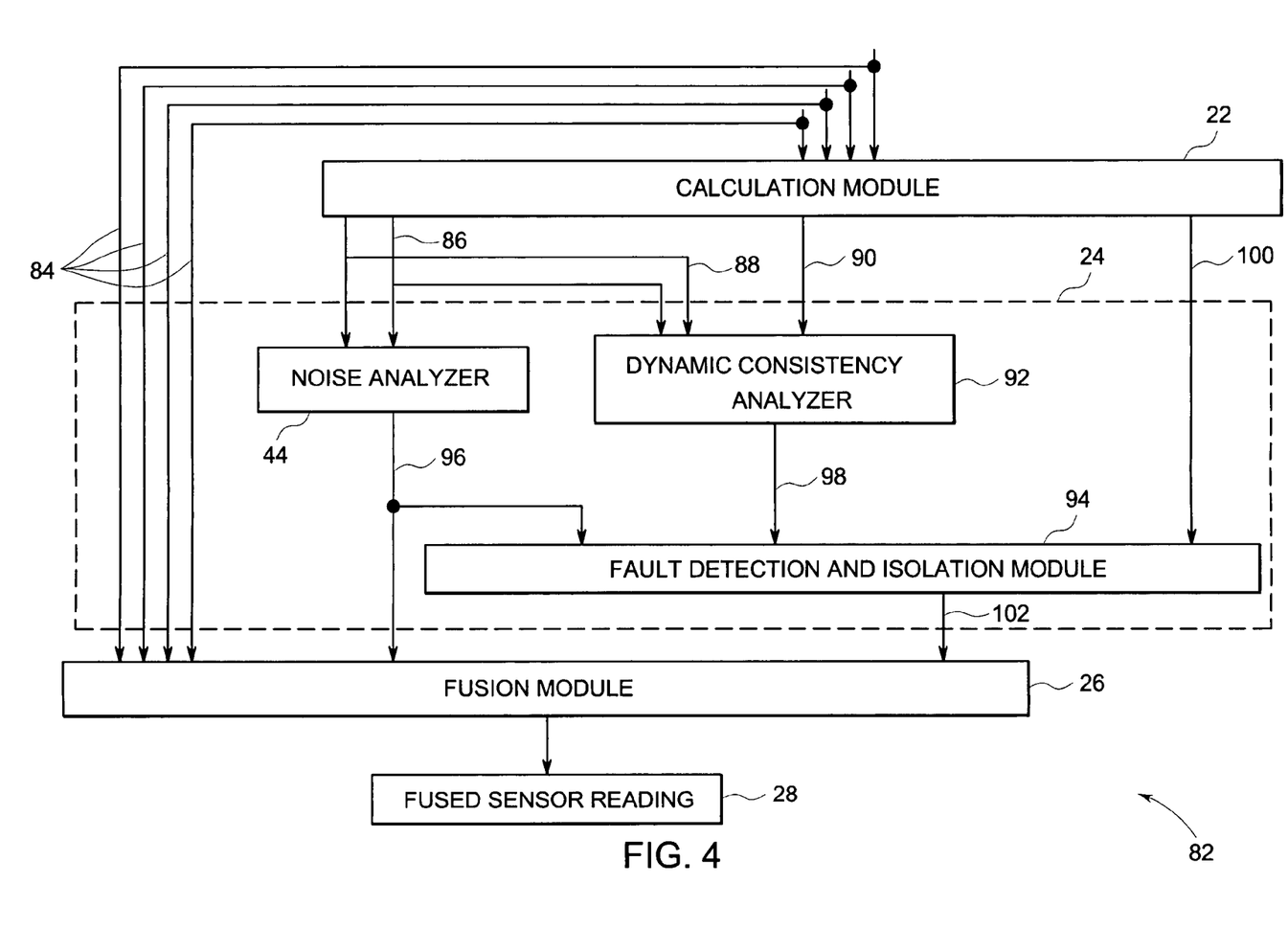
FIG. 4 is a block diagram showing an exemplary sensor system that includes four redundant sensors in accordance with certain aspects of the present technique.

FIG. 4 is a block diagram showing an exemplary sensor system 82 that includes four redundant sensors in accordance with certain aspects of the present technique. For the purposes of discussion, the parameter that is being monitored is an inlet temperature in an exemplary gas turbine (not shown for clarity).

The present implementation 82 includes the calculation module 22, the analysis module 24, and the fusion module 26, which produces the fused sensor reading 28. The calculation module 22 in the present implementation is configured to accept four sensor readings, each of which is generally represented by reference numeral 84. The calculation module 22 is adapted to determine signal 86 indicative of an auto-covariance and a signal 88 indicative of a cross covariance of each of the four sensor readings (each represented by reference numeral 84) as well as a signal 90 indicative of an autocorrelation of divergence of the four sensor readings 84. The signal 90 may be considered as an indication of consistency of the values indicated by the quadruple sensors. The signals 88 and 90 of the four sensor readings may be defined mathematically as follows:

$$CrossCov_{i,j} = \frac{1}{N-1} \sum_{k=1}^{N}\left(Sensor_i(k) - \frac{1}{N}\sum_{m=1}^{N}Sensor_i(m)\right)\left(Sensor_j(k) - \frac{1}{N}\sum_{m=1}^{N}Sensor_j(m)\right)$$

$$Corr_{i,j} = \frac{1}{N}\sum_{k=1}^{N}(Sensor_i(k) - Sensor_j(k)) \times (Sensor_i(k) - Sensor_j(k))$$

where i and j take on the values of 1, 2, 3 and 4 for the quadruple sensor system. As explained previously, N is fixed-window size of data for which calculations are done at a time. As specified earlier, 'm' is the lag of correlation sequence. It should be noted that auto-covariance is a special case of cross-covariance. While cross-covariance measures the linear-relationship strength between two variables in general, while auto-covariance measure the strength of a variable's linear-relationship to itself, which physically represents the spread of that particular variable. The correlation $Corr_{i,j}$ represents the value-consistency between sensor i and sensor j. Because $Corr_{i,j} = Corr_{j,i}$, a set of dynamic consistency is defined as the vector 100 below:

$$V\_Consist = [Corr_{1,2} Corr_{1,3} Corr_{1,4} Corr_{2,3} Corr_{2,4} Corr_{3,4}]$$

The analysis module 24 includes the noise analyzer 44, the dynamic consistency analyzer 92 and the fault detection and isolation module 94. The noise analyzer 44 functions in a manner as was explained previously for the embodiment illustrated in FIG. 2. The NNT is established in terms of physically possible variance in sensor reading for each of the sensors. Any sensor having a variance under the NNT is treated as a lifeless sensor, meaning that the confidence value assigned to that particular sensor is zero. The rest of the sensors are assigned a noiselessness confidence value based upon relative variance from the sum of all of the sensors whose confidence value is not zero. It must be noted that the variance of a sensor reading of an operational parameter indicates the stability of the sensor in measuring or monitoring the operational parameter. Further, since the confidence value is assigned based on relative sensor readings, the assignment of the noiselessness confidence value differs with the number of redundant sensors. For example, for the quadruple sensor arrangement in the present embodiment, the confidence value for each of the four sensors (designated 1, 2, 3, 4) may symbolically be represented as:

$$N\_Conf_1 = \frac{1}{3} \times \frac{Cov_{2,2} + Cov_{3,3} + Cov_{4,4}}{Cov_{1,1} + Cov_{2,2} + Cov_{3,3} + Cov_{4,4}}$$

$$N\_Conf_2 = \frac{1}{3} \times \frac{Cov_{1,1} + Cov_{3,3} + Cov_{4,4}}{Cov_{1,1} + Cov_{2,2} + Cov_{3,3} + Cov_{4,4}}$$

$$N\_Conf_3 = \frac{1}{3} \times \frac{Cov_{1,1} + Cov_{2,2} + Cov_{4,4}}{Cov_{1,1} + Cov_{2,2} + Cov_{3,3} + Cov_{4,4}}$$

-continued $$N\_Conf_4 = \frac{1}{3} \times \frac{Cov_{1,1} + Cov_{2,2} + Cov_{3,3}}{Cov_{1,1} + Cov_{2,2} + Cov_{3,3} + Cov_{4,4}}$$

where $N\_Conf_1$, $N\_Conf_2$, $N\_Conf_3$, $N\_Conf_4$ are the noiselessness confidence values assigned to sensor 1, sensor 2, sensor 3 and sensor 4 respectively.

Similarly, in certain implementations, when only two of the four redundant sensors are deemed to be normal in terms of noiselessness, the two abnormal sensors are assigned a confidence value of zero while the confidence values for the two normal sensors (designated 1 and 2) may mathematically be represented as:

$$N\_Conf_1 = \frac{Cov_{2,2}}{Cov_{1,1} + Cov_{2,2}}$$

$$N\_Conf_2 = \frac{Cov_{1,1}}{Cov_{1,1} + Cov_{2,2}}$$

Further, in certain other implementations, when only three of the four redundant sensors are deemed to be normal, the abnormal sensor is assigned a noiselessness confidence value of zero while the confidence values for each of the three normal sensors (designated 1, 2, 3) may symbolically be represented as:

$$N\_Conf_1 = \frac{1}{2} \times \frac{Cov_{2,2} + Cov_{3,3}}{Cov_{1,1} + Cov_{2,2} + Cov_{3,3}}$$

$$N\_Conf_2 = \frac{1}{2} \times \frac{Cov_{1,1} + Cov_{3,3}}{Cov_{1,1} + Cov_{2,2} + Cov_{3,3}}$$

$$N\_Conf_3 = \frac{1}{2} \times \frac{Cov_{1,1} + Cov_{2,2}}{Cov_{1,1} + Cov_{2,2} + Cov_{3,3}}$$

The output of the noise analyzer is the "noisele" confidence vector 96.

The dynamic consistency analyzer 92 analyzes the dynamic consistency of the four sensor readings 84. Dynamic consistency may be defined as a value that represents how much of the dynamical change in the sensor reading from a particular sensor is consistent with the dynamic change in the sensor readings of each of the other three sensors. As will be appreciated by a person skilled in the art, the pair of sensors that exhibit a similar dynamical change in the sensor readings are treated as being the reliable sensors. For determining the dynamic consistency for the four sensors, a covariance matrix is formed. Mathematically, the covariance matrix may be defined as:

$$Mat\_Cov = \begin{bmatrix} Cov_{1,1} & Cov_{1,2} & Cov_{1,3} & Cov_{1,4} \\ Cov_{1,2} & Cov_{2,2} & Cov_{2,3} & Cov_{2,4} \\ Cov_{1,3} & Cov_{2,3} & Cov_{3,3} & Cov_{3,4} \\ Cov_{1,4} & Cov_{2,4} & Cov_{3,4} & Cov_{4,4} \end{bmatrix}$$

Once the covariance matrix is formed, the eigenvalue matrix Eig D and the eigenvector set Eig V of the covariance matrix are determined using the following matrix equation that represents principal component analysis of the covariance matrix.

$$\text{Mat\_Cov} \times \text{Eig\_V} = \text{Eig\_V} \times \text{Eig\_D}$$

$$\text{Eig\_V} = [v_1, v_2, v_3, v_4], v_1 \in R_{4 \times 1}$$

$$\text{Eig\_D} = \begin{bmatrix} \sigma_1 & 0 & 0 & 0 \\ 0 & \sigma_2 & 0 & 0 \\ 0 & 0 & \sigma_3 & 0 \\ 0 & 0 & 0 & \sigma_4 \end{bmatrix}$$

where $v_i$ and $\sigma_i$ are eigenvector and eigenvalue respectively. The eigenvector corresponding to the maximum eigenvalue is selected. The maximum eigenvalue is determined: The corresponding matrix equation is:

$$\sigma_m = \text{MAX}(\sigma_1, \sigma_2, \sigma_3, \sigma_4)$$

$$\text{Mat\_Cov} \times v_m = \sigma_m \times v_m$$

$$v_m = [v_{m1}, v_{m2}, v_{m3}, v_{m4}]$$

where the elements $v_{m1}, v_{m2}, v_{m3}, v_{m4}$ represent the principal dynamical change of the four sensor readings respectively. Once the dynamical change is determined, the dynamic consistency for each pair of sensor readings among the quadruple sensors is determined as Dynamic Consistency$_{i,j} = |v_i - v_j|$ where i and j represent two sensors. It should be particularly noted that dynamic consistency for a pair of sensors should be the same for the two sensors to be classified as reliable sensors. In other words, $DC_{i,j} = DC_{j,i}$. Subsequently, a set of dynamic consistency for four sensors may be defined as D_Consist=[$DC_{1,2}$ $DC_{1,3}$ $DC_{1,4}$ $DC_{2,3}$ $DC_{2,4}$ $DC_{3,4}$] It should be noted that the dynamic consistencies $DC_{21}$, $DC_{31}$, $DC_{41}$, $DC_{32}$ are not specified because of the equality criteria specified hereinabove. The output of the dynamic consistency analyzer 92 is the D_Consist 98, the set of dynamic consistency vector for all the four sensors.

The fault detection and isolation (FDI) module 94 is configured to detect and isolate faulty, failed or unreliable sensors from the group of redundant sensors. The FDI module 94 receives as input, the noiselessness level confidence values (represented by reference numeral 96) from the noise analyzer 44, the dynamic consistency vectors (represented by reference numeral 98) from the dynamic consistency analyzer 92 and value consistency vector 100 from the calculation module 22. The detection and isolation functions happen in various stages. Firstly, the FDI module 94 discards sensor readings (and thereby the sensor) that have been assigned a noiselessness level confidence value of zero. The FDI module 94 then compares the dynamic consistencies that are not related to the rejected sensors. For example, consider the dynamic consistency vector provided in the section above. If, for instance, sensor 1 was assigned a confidence value of zero, the FDI module 94 will redefine the dynamic consistency vector as D_Consist=[$DC_{2,3}$ $DC_{2,4}$ $DC_{3,4}$], meaning that all dynamic consistencies associated with sensor 1 will be removed from consideration. After redefining the dynamic consistency vector, the minimum of the elements in the D_Consist is selected and the sensor readings relating to the minimum element are chosen as being the most reliable sensor readings. For instance, if $DC_{2,3}$ is the minimum element in the redefined dynamic consistency vector, then the sensor readings from sensors 2 and 3 in the four sensor implementation are considered to be the most reliable. In certain implementations of the present technique, when more than two pairs of sensor readings have the same set of dynamic consistencies, then the value consistency 100 of each of the sensor readings is used to determine the most reliable pair of sensor readings. In such a case, the sensor readings having the least value of the value consistency (which is determined as a function of divergence of correlation of sensor readings) is chosen as the reliable pair of sensor readings.

As will be appreciated by a person skilled in the art, if more than two elements have the minimum value for the value consistency, the sensors contributing to the minimum value are considered to be reliable sensors. Furthermore, when two independent sensor reading pairs have the same value for the dynamic consistency and value consistency, then the sensors are considered to be reliable.

The fusion module 26 accepts as input, the noiselessness confidence values 96 for each of the sensor readings as well as the output 102 from the FDI module 94 that contains information about which sensor reading and the sensor is reliable, i.e., whether any sensor reading can be accepted or be rejected. The fusion module 26 weights each of the accepted sensor readings by the respective confidence value assigned to that sensor reading.

Figure 5:
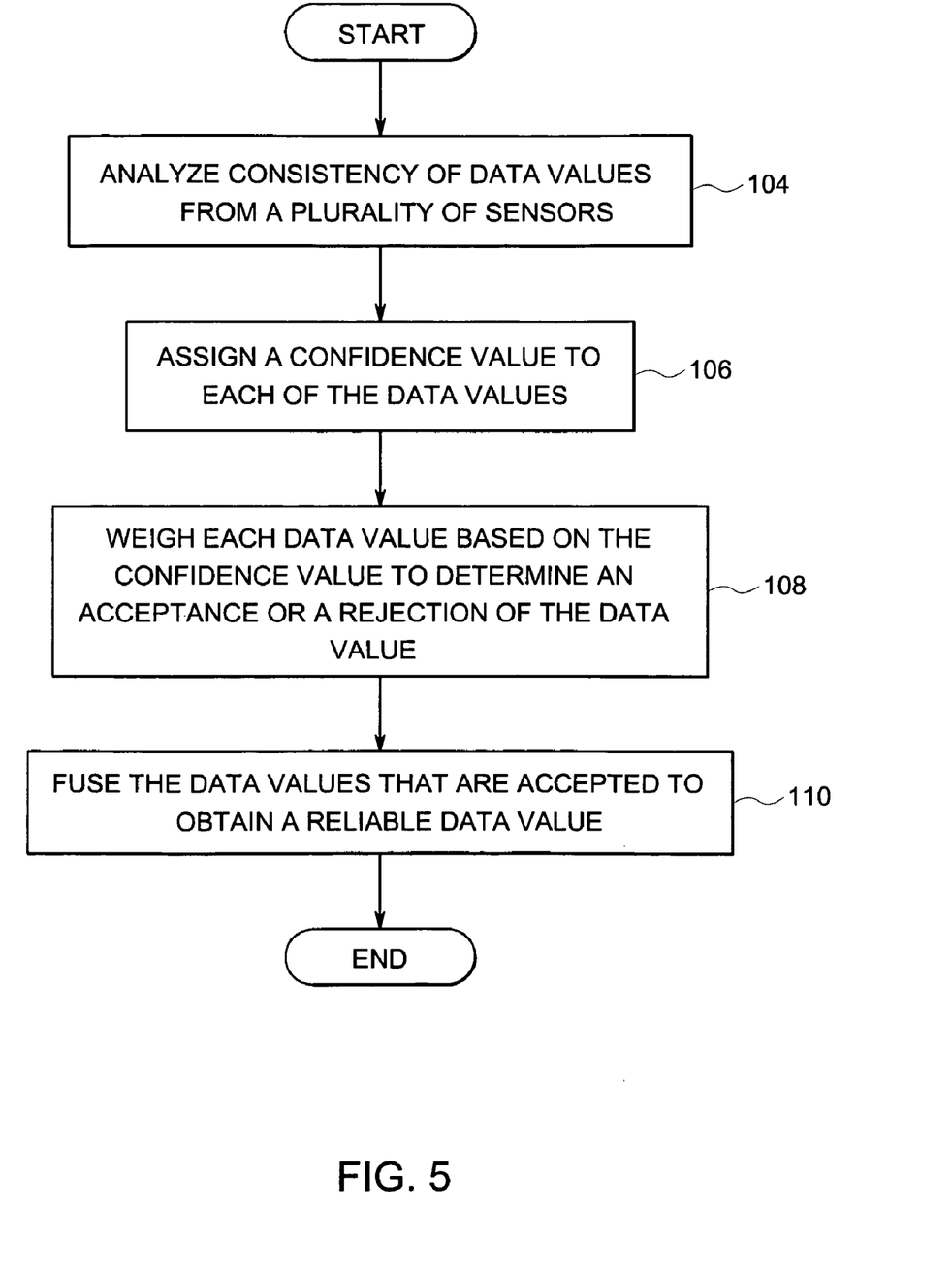
FIG. 5 is a flow diagram showing an exemplary process in accordance with certain aspects of the present technique.

FIG. 5 is a flow diagram showing an exemplary process in accordance with certain aspects of the present technique. The method involves analyzing consistency of a set of sensor readings obtained from a plurality of sensors (step 104). As explained in the sections hereinabove, the analysis of consistency among the sensor readings can be done in a variety of ways. Examples include noise analysis, dynamic property analysis and value based consistency analysis and the like. The method then involves, at step 106, assigning a confidence value to each of the sensor reading based on at least the analysis done in step 104. The confidence value, in certain instances, may be assigned based on the noise signal level in the sensor readings. In other instances, the confidence value for each sensor reading may be based upon the detected spike and/or drift in the sensor reading. The method further involves, at step 108, weighting each sensor reading based on at least the confidence value assigned to each sensor reading in order to determine an acceptance or a rejection of each sensor reading. In certain instances, the method may involve determining the acceptance or rejection of the sensor reading based upon the consistency of each of the sensor reading. Finally, at step 110, the method involves fusing the accepted sensor readings to obtain a reliable and fused sensor reading.

The various embodiments and aspects already described in the earlier sections may include an ordered listing of executable instructions for implementing the various logical functions. The ordered listing can be embodied in any computer-readable medium for use by or in connection with a computer-based system that can retrieve the instructions and execute them as per the indicated logical functions of the various modules. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or flash memory) (magnetic), an optical fiber (optical), and a portable compact disc read-only memory (CDROM) (optical). Note that the com-

The invention claimed is:

1. A method of controlling at least one operational characteristic of a device, the method comprising:
analyzing consistency of a plurality of sensor readings obtained from a plurality of sensors monitoring the device, wherein each of the sensor readings is indicative of the at least one operational parameter of the device;
assigning a confidence value to each of the sensor readings, wherein the confidence value is indicative of an operational condition of one of the plurality of sensors that provided the sensor reading;
weighting each of the sensor readings based on the confidence value assigned to the sensor reading to determine an acceptance or a rejection of the sensor reading;
fusing the sensor readings that are accepted to obtain a fused sensor reading corresponding to the operational parameter measured by the sensors on the device; and
controlling the at least one operational characteristic based on the fused sensor reading.

2. The method of claim 1, wherein analyzing the consistency of the plurality of sensor readings comprises analyzing a noise-level, a dynamic consistency or a value consistency for each of the sensor readings.

3. The method of claim 2, further comprising building a covariance matrix of the plurality of sensor readings for analyzing the dynamic consistency of each of the sensor readings based on deviation of an eigenvector of each of the sensor readings from each other, wherein the eigenvectors are determined via a principal component analysis of the covariance matrix.

4. The method of claim 3, wherein the covariance matrix is based on at least two auto covariances of the sensor readings or two cross covariances of the sensor readings.

5. The method of claim 2, further comprising evaluating a correlation of divergence of the sensor readings that have a substantially equivalent value consistency.

6. The method of claim 1, further comprising determining an auto-covariance of each of the sensor readings prior to assigning a noiselessness confidence value for each of the sensor readings.

7. The method of claim 1, wherein monitoring the device comprises monitoring an inlet temperature, an outlet temperature, an inlet pressure, an outlet pressure, a device temperature, a device vibration, a fuel consumption, a fuel level, or combinations thereof.

8. The method of claim 1, further comprising detecting a spike in each of the sensor readings to enable detection of a faulty sensor.

9. The method of claim 8, comprising isolating the faulty sensor based on a prediction model.

10. A sensor system, comprising:
a plurality of sensors adapted to provide a plurality of sensor readings, wherein each of the sensor readings is indicative of an operational parameter of a device;
a calculation module adapted to calculate a covariance of the sensor reading or a correlation of divergence of at least two of the sensor readings;
an analysis module configured to assign a confidence value to the sensor reading or to determine a dynamic consistency of the sensor reading; and
a fusion module configured to determine a reliable sensor reading based on at least a weighting of the sensor reading based on the confidence value assigned to the sensor reading or the dynamic consistency of the sensor reading.

11. The sensor system of claim 10, further comprising a fault detection and isolation module configured to detect and isolate failed sensors from the plurality of sensors, wherein any sensor reading assigned a confidence value of zero is isolated and wherein any sensor reading inconsistent with the rest of the sensor readings is isolated.

12. The sensor system of claim 10, wherein the analysis module comprises a noise analyzer, a value consistency analyzer or a dynamic consistency analyzer.

13. The sensor system of claim 10, wherein the analysis module is configured to detect a spiking in the sensor reading and identify a faulty sensor based upon the spiking.

14. The sensor system of claim 13, wherein the spiking is detected based on correlation of divergence of any two of the sensor readings.

15. The sensor system of claim 13, wherein the spiking is isolated based on the covariance of each of the sensor reading.

16. The sensor system of claim 15, wherein the auto-correlation is indicative of a drift in the any two of the sensor readings.

17. The sensor system of claim 16, wherein a drifting sensor is isolated based on a prediction model.

18. The sensor system of claim 16, wherein the analysis module assigns the confidence value to each of the data values based upon the drift.

19. The sensor system of claim 10, wherein the correlation of divergence of any two of the sensor readings is determined via an auto-correlation.

20. A system, comprising:
an industrial device;
a plurality of sensors configured to provide sensor readings, wherein each sensor reading is indicative of an operational parameter of the industrial device;
a calculation module configured to calculate a covariance of at least two of the sensor readings or a correlation of divergence of at least two of the sensor readings;
an analysis module configured to assign a confidence value to each of the sensor readings or to determine a dynamic consistency of each of the sensor readings; and
a fusion module configured to determine a reliable sensor reading based on at least a weighting of the sensor readings based on the confidence value for each of the sensor readings or the dynamic consistency of each of the sensor readings.

21. The system of claim 20, wherein the industrial device comprises a gas turbine, a steam turbine, a water turbine, a fuel cell, or a wind turbine or a subcomponent thereof.

22. The system of claim 20, further comprising a fault isolation module configured to detect and isolate failed sensors from the plurality of sensors, wherein the sensor readings assigned a confidence value of zero are isolated and wherein any sensor reading inconsistent with the rest of the sensor readings is isolated.

23. The system of claim 20, wherein the analysis module comprises a noise analyzer, a value consistency analyzer or a dynamic consistency analyzer.

24. The system of claim 20, wherein the operational parameters comprise an inlet temperature, an outlet temperature, an inlet pressure, an outlet pressure, a device temperature, a device vibration, a fuel consumption, a fuel level, or combinations thereof.

* * * * *